US012229650B2

(12) United States Patent
David et al.

(10) Patent No.: US 12,229,650 B2
(45) Date of Patent: *Feb. 18, 2025

(54) SYSTEM AND METHOD FOR COMPACT AND EFFICIENT SPARSE NEURAL NETWORKS

(71) Applicant: Nano Dimension Technologies, Ltd., Ness Ziona (IL)

(72) Inventors: Eli David, Tel Aviv (IL); Eri Rubin, Ma'ale Ha'hamisha (IL)

(73) Assignee: NANO DIMENSION TECHNOLOGIES, LTD., Ness Ziona (IL)

( * ) Notice: Subject to any disclaimer, the term of this patent is extended or adjusted under 35 U.S.C. 154(b) by 137 days.

This patent is subject to a terminal disclaimer.

(21) Appl. No.: 18/168,016

(22) Filed: Feb. 13, 2023

(65) Prior Publication Data

US 2023/0196061 A1 Jun. 22, 2023

Related U.S. Application Data

(63) Continuation of application No. 16/524,571, filed on Jul. 29, 2019, now Pat. No. 11,580,352, which is a
(Continued)

(51) Int. Cl.
*G06N 3/02* (2006.01)
*G06N 3/04* (2023.01)

(52) U.S. Cl.
CPC .................. *G06N 3/02* (2013.01); *G06N 3/04* (2013.01)

(58) Field of Classification Search
None
See application file for complete search history.

(56) References Cited

U.S. PATENT DOCUMENTS

| 10,339,450 | B2 | 7/2019 | David |
| 2015/0206048 | A1 | 7/2015 | Talathi et al. |

(Continued)

FOREIGN PATENT DOCUMENTS

| CN | 105488563 | 4/2016 |
| CN | 105512723 | 4/2016 |

(Continued)

OTHER PUBLICATIONS

Han et al., "Learning both weights and connections for efficient neural network." In: Advances in neural information processing systems. Oct. 30, 2015, Retrieved from <https://arxiv.org/pdf/1506.02626.pdf> entire document.

(Continued)

*Primary Examiner* — Vincent Gonzales
(74) *Attorney, Agent, or Firm* — PEARL COHEN ZEDEK LATZER BARATZ LLP

(57) ABSTRACT

A device, system, and method is provided for storing a sparse neural network. A plurality of weights of the sparse neural network may be obtained. Each weight may represent a unique connection between a pair of a plurality of artificial neurons in different layers of a plurality of neuron layers. A minority of pairs of neurons in adjacent neuron layers are connected in the sparse neural network. Each of the plurality of weights of the sparse neural network may be stored with an association to a unique index. The unique index may uniquely identify a pair of artificial neurons that have a connection represented by the weight. Only non-zero weights may be stored that represent connections between pairs of neurons (and zero weights may not be stored that represent no connections between pairs of neurons).

24 Claims, 5 Drawing Sheets

| From channel ID | To channel ID | filter |
|---|---|---|
| 1 | 8 | 0.4, 0.5, ... |
| 1 | 15 | 0.6, 0.4, ... |
| 2 | 5 | -1.6, 0.8, ... |
| 2 | 7 | 1.2, 0.2, ... |
| 2 | 9 | 1.0, 0.9, ... |
| 3 | 6 | 0.1, 0.4, ... |
| 3 | 12 | 0.9, 0.3, ... |
| 4 | 6 | -0.3, 0.5, ... |
| 5 | 11 | -0.7, 0.4, ... |
| 5 | 5 | -1.4, 0.0, ... |
| 6 | 9 | 0.4, 0.6, ... |
| 6 | 13 | -0.8, 0.7, ... |
| 6 | 8 | 0.3, 0.8, ... |
| 7 | 11 | 1.1, 0.3, ... |
| 7 | 14 | 0.2, 0.4, ... |
| 8 | 10 | 0.5, 0.7, ... |
| 8 | 12 | -0.9, 0.9, ... |
| 9 | 14 | 0.2, 0.4, ... |
| 9 | 12 | 0.6, 0.6, ... |
| 10 | 13 | -1.3, 0.2, ... |
| 10 | 16 | 0.8, -0.5, ... |
| 11 | 15 | 0.4, 0.8, ... |
| 12 | 15 | -0.5, 1.5, ... |
| 12 | 12 | -0.1, 0.6, ... |

Related U.S. Application Data continuation of application No. 16/041,497, filed on Jul. 20, 2018, now Pat. No. 10,366,322, said application No. 16/524,571 is a continuation of application No. PCT/IL2018/051062, filed on Sep. 20, 2018, which is a continuation of application No. 16/041,497, filed on Jul. 20, 2018, now Pat. No. 10,366,322.

(60) Provisional application No. 62/569,033, filed on Oct. 6, 2017.

(56) References Cited

U.S. PATENT DOCUMENTS

| | | | |
|---|---|---|---|
| 2015/0294217 | A1 | 10/2015 | Aparicio, IV |
| 2016/0275397 | A1 | 9/2016 | Neil et al. |
| 2018/0210862 | A1 | 7/2018 | Akerib |
| 2018/0253635 | A1 | 9/2018 | Park |
| 2019/0286981 | A1 | 9/2019 | Ahmed |

FOREIGN PATENT DOCUMENTS

| | | |
|---|---|---|
| CN | 105874477 | 8/2016 |
| CN | 106462798 | 2/2017 |
| CN | 107229967 | 10/2017 |
| WO | WO2017124646 | 7/2017 |

OTHER PUBLICATIONS

Lecun et al., "Deep learning", Nature, vol. 521, May 28, 2015, pp. 436-444, 2015.
Liu et al., "Sparse convolutional neural networks", Computer Vision and Pattern Recognition, IEEE, 2015, pp. 806-814., 2015.
Russell et al., "Artificial Intelligence: A Modern Approach", 2nd Ed., pp. 649-789., 2003.
Srinivas et al., "Training sparse neural networks." In: 2017 IEEE Conference on Computer Vision and Pattern Recognition Workshops (CVPRW). Jul. 26, 2017 Retrieved from <http://openaccess.thecvf.com/content_cvpr_2017_workshops/w4/papers/Srinivas_Training_Sparse_Neural_CVPR_2017_paper.pdf> entire document.
David, Eli, U.S. Appl. No. 16/211,994, filed Dec. 6, 2018.
Lu Yuntao et al: "SparseNN: A Performance-Efficient Accelerator for Large-Scale Sparse Neural Networks", International Journal of Parallel Programming, Plenum Press, New York, US, vol. 46, No. 4, Oct. 3, 2017 (Oct. 3, 2017), pp. 648-659, XP036570932, ISSN: 0885-7458, DOI:10.1007/S10766-017-0528-8 [retrieved on Oct. 3, 2017].
Han Song et al: "EIE: Efficient Inference Engine on Compressed Deep Neural Network", 2013 21st International Conference on Program Comprehension (ICPC); [International Symposium on Computer Architecture (ISCA)], IEEE, US, Jun. 18, 2016 (Jun. 18, 2016), pp. 243-254, XP032950663, ISSN: 1063-6897, DOI: 10.1109/ISCA.2016.30 ISBN: 978-0-7695-3174-8 [retrieved on Aug. 24, 2016].
Jiecao Yu et al: "Scalpel", Proceedings of the 44th Annual International Symposium on Computer Architecture, ISCA '17, ACM Press, New York, New York, USA, Jun. 24, 2017 (Jun. 24, 2017), pp. 548-560, XP058369127, DOI:10.1145/3079856.3080215 ISBN: 978-1-4503-4892-8.
Anwar Sajid Sajid@DSP Snu AC KR et al: "Structured Pruning of Deep Convolutional Neural Networks", ACM Journal on Emerging Technologies in Computing Systems (JETC), ACM, 2 Penn Plaza, Suite 701 New York NY 10121-0701 USA, vol. 13, No. 3, Feb. 9, 2017 (Feb. 9, 2017), pp. 1-18, XP058486443, ISSN: 1550-4832, DOI: 10.1145/3005348.
Martin Abadi et al.: "TensorFlow: A System for Large-Scale Machine Learning", Proceedings of the 12th USENIX Symposium on Operating Systems Design and Implementation (OSDI ’16), Nov. 4, 2016 (Nov. 4, 2016), XP055389572, Retrieved from the Internet: URL:https://www.usenix.org/system/files/conference/osdi16/osdi16-abadi.pdf [retrieved on Jul. 11, 2017].
Vivienne Sze et al: "Efficient Processing of Deep Neural Networks: A Tutorial and Survey", arxiv.org, Cornell University Library, 201 Olin Library Cornell University Ithaca, NY 14853, Mar. 27, 2017 (Mar. 27, 2017), XP080759895, DOI: 10.1109/JPROC.2017.2761740.
Cook J et al: "Parallel neural network simulation using sparse matrix techniques", Microprocessing and Microprogramming, Elsevier Science Publishers, BV., Amsterdam, NL, vol. 24, No. 1-5, Aug. 1, 1988 (Aug. 1, 1988), pp. 621-626, XP026620036, ISSN: 0165-6074, DOI:10.1016/0165-6074(88)90120-2[retrieved on Aug. 1, 1988].
Anonymous: "Sparse matrix—Wikipedia the free encyclopedia" Jul. 12, 2010 (Jul. 12, 2010), XP055170212, Retrieved from the Internet:URL:http://en.Wikipedia.org/w/index.php?title=Sparse_matrix&oldid=373067299 [retrieved on Feb. 17, 2015].

Pruned sparse neural network with 10 connections, and the corresponding triplet representation Original dense neural network with 32 connections

| From Neuron ID | To Neuron ID | Weight |
|---|---|---|
| 1 | 8 | 0.4 |
| 1 | 15 | 0.6 |
| 2 | 5 | -1.6 |
| 2 | 7 | 1.2 |
| 2 | 9 | 1.0 |
| 3 | 6 | 0.1 |
| 3 | 12 | 0.9 |
| 4 | 6 | -0.3 |
| 5 | 11 | -0.7 |
| 5 | 5 | -1.4 |
| 6 | 9 | 0.4 |
| 6 | 13 | -0.8 |
| 6 | 8 | 0.3 |
| 7 | 11 | 1.1 |
| 7 | 14 | 0.2 |
| 8 | 10 | 0.5 |
| 8 | 12 | -0.9 |
| 9 | 14 | 0.2 |
| 9 | 12 | 0.6 |
| 10 | 13 | -1.3 |
| 10 | 16 | 0.8 |
| 11 | 15 | 0.4 |
| 12 | 15 | -0.5 |
| 12 | 12 | -0.1 |

Sparse neural network with skip and recurrent connections, and the corresponding triplet representation

SYSTEM AND METHOD FOR COMPACT AND EFFICIENT SPARSE NEURAL NETWORKS

CROSS-REFERENCE TO RELATED APPLICATIONS

This Application is a continuation of U.S. patent application Ser. No. 16/524,571 filed Jul. 29, 2019 which will issue as U.S. Pat. No. 11,580,352 on Feb. 14, 2023, which is continuation of U.S. patent application Ser. No. 16/041,497 filed Jul. 20, 2018 which issued as U.S. Pat. No. 10,366,322 on Jul. 30, 2019, which in turn claims benefit of U.S. Provisional Patent Application No. 62/569,033, filed Oct. 6, 2017, and is also a continuation of P.C.T. International Application No. PCT/IL2018/051062 filed Sep. 20, 2018, which is in turn a continuation of U.S. patent application Ser. No. 16/041,497 filed Jul. 20, 2018 which issued as U.S. Pat. No. 10,366,322 on Jul. 30, 2019, which in turn claims benefit of U.S. Provisional Patent Application No. 62/569,033 filed Oct. 6, 2017, all of which are hereby incorporated by reference in their entirety.

FIELD OF THE INVENTION

Embodiments of the invention are related to the field of artificial intelligence (AI) by machine learning. In particular, embodiments of the invention are related to deep learning using neural networks.

BACKGROUND OF THE INVENTION

An artificial neural network, or simply "neural network," is a computer model, resembling a biological network of neurons, which is trained by machine learning. A traditional neural network has an input layer, multiple middle or hidden layer(s), and an output layer. Each layer has a plurality (e.g., 100s to 1000s) of artificial "neurons." Each neuron in a layer (N) may be connected by an artificial "synapse" to some or all neurons in a prior (N−1) layer and subsequent (N+1) layer to form a "partially-connected" or "fully-connected" neural network. The strength of each synapse connection is represented by a weight. Thus, a neural network may be represented by a set of all weights in the network.

A neural network (NN) is trained based on a learning dataset to solve or learn a weight of each synapse indicating the strength of that connection. The weights of the synapses are generally initialized, e.g., randomly. Training is performed by iteratively inputting a sample dataset into the neural network, outputting a result of the neural network applied to the dataset, calculating errors between the expected (e.g., target) and actual outputs, and adjusting neural network weights using an error correction algorithm (e.g., backpropagation) to minimize errors. Training may be repeated until the error is minimized or converges. Typically multiple passes (e.g., tens or hundreds) through the training set is performed (e.g., each sample is input into the neural network multiple times). Each complete pass over the entire training set is referred to as one "epoch".

State-of-the-art neural networks typically have between millions and billions of weights, and as a result require specialized hardware (usually a GPU) for both training and runtime (prediction) phases. It is thereby impractical to run deep learning models, even in prediction mode, on most endpoint devices (e.g., IoT devices, mobile devices, or even laptops and desktops without dedicated accelerator hardware). Effectively running deep learning models on devices with limited processing speed and/or limited memory availability remains a critical challenge today.

To address the problem of limited hardware capacity, nowadays most deep learning prediction is conducted on a remote server or cloud. For example, a smart assistant (e.g., Alexa) sends information (e.g., voice signal) to the cloud, the deep learning prediction is performed remotely at the cloud on dedicated hardware, and a response is sent back to the local device. Hence, these endpoint devices cannot provide deep learning based results if they are disconnected from the cloud, if the input rate is so high that it is not feasible to continuously communicate with the cloud, or if very fast prediction is required where even the dedicated hardware is not fast enough today (e.g., deep learning for high frequency trading).

Accordingly, there is a need in the art to increase the efficiency and decrease the memory requirements of deep learning for neural network in training and/or prediction modes.

SUMMARY OF THE INVENTION

According to some embodiments of the invention, there is provided a device, system and method for pruning a neural network (e.g., eliminating synapse connections) or evolving a neural network (e.g., using evolutionary computation such as genetic algorithms or genetic programming, or using reinforcement learning) to generate a sparse neural network during the training phase, and a new compact data representation for sparse neural networks that eliminates storing and processing disconnected synapses.

According to some embodiments of the invention, there is provided a device, system and method for storing a sparse neural network. A plurality of weights of the sparse neural network may be obtained. Each weight may represent a unique connection between a pair of a plurality of artificial neurons in different layers of a plurality of neuron layers. A minority of pairs of neurons in adjacent neuron layers are connected in the sparse neural network. Each of the plurality of weights of the sparse neural network may be stored with an association to a unique index. The unique index may uniquely identify a pair of artificial neurons that have a connection represented by the weight. Only non-zero weights may be stored that represent connections between pairs of neurons (and zero weights may not be stored that represent no connections between pairs of neurons).

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figures 1, 2:
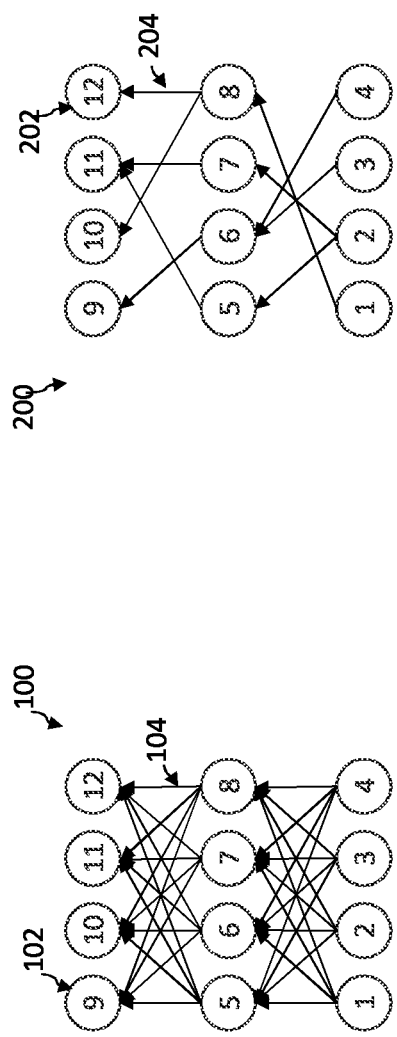
FIG. 1 is a schematic illustration of a dense neural network in accordance with some embodiments of the invention.
FIG. 2 is a schematic illustration of a sparse neural network, for example, generated by pruning neuron connections of the neural network of FIG. 1, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Currently, pruning is only used in a post-training phase, but not during the training phase. For example, only after training the neural network in a conventional way (without pruning), a post-processing step analyzes the resulting neural network to determine which weights could be removed without detrimental effect (without reducing the accuracy of the neural network). This method has several shortcomings, e.g., it results in only modest pruning because the neural network is fixed and most pruning causes error (if not corrected during training), requires intensive trial and error in the post-processing phase (e.g., testing the error effect of pruning each individual weight or combination of weights), depends on specific neural network architectures (e.g., can only be applied to a convolutional neural network (CNN) because it uses heuristics for pruning that are specific to CNNs), and typically does not significantly reduce the memory requirements of the network (e.g., storing pruned weights as zeros, which occupies the same (or approximately the same) memory space as non-zero weights).

Embodiments of the invention provide a novel system and method to generate a sparse neural network by pruning weak synapse connections during the training phase (instead of only during post-training processing) or by evolving a sparse neural network (e.g., using evolutionary computation). Embodiments of the invention further provide a novel compact data representation for sparse neural networks that independently indexes each weight to eliminate the need to store pruned synapse weights. These embodiments provide several significant improvements:

Enables a significantly larger amount of sparsity in neural networks, e.g., pruning up to 90-99.9% of the weights in the network, as compared to post-training pruning that is limited to prunes that do not cause error in the fixed already-trained network, e.g., typically a few percent of the weights in the network.

Results in both prediction mode and training mode having a linear speed-up directly proportional to the amount of sparsity induced in the neural network. For example, a 50% sparse neural network (retaining less than 50% or a minority of its weights) results in two times (or 200%) faster prediction and training, and a 90% sparse neural network (retaining 10% of its weights) results in 10 times (or 1000%) faster prediction and training. In general, the greater the sparsity of the neural network, the faster the prediction and training times.

Results in a linear decrease in memory usage in prediction mode and training mode. For example, independently indexing weights eliminates the need to store pruned weights, but each non-pruned weight uses twice the memory (e.g., storing the index as well as the value), resulting in a 10/2 or 5 times (80%) reduction in memory consumption for a 90% sparse neural network.

Results in a linear speed-up on any hardware. For example, a 90% sparse neural network results in a 10 times speed-up in comparison to a non-sparse network, regardless of the computation device, e.g., whether running on a slow CPU or a fast dedicated GPU. In other words, while embodiments of the invention may provide improvements to efficiency that allow deep learning of sparse neural networks on CPU or memory restricted devices (that cannot efficiently process or store conventional neural networks), the same embodiments may be implemented by fast hardware to result in a speed-up and storage reduction of several orders of magnitude (this is critical in areas such as real-time navigation, where it is infeasible to use deep learning even on the fastest dedicated hardware).

The method is agnostic to the type of neural network and can be applied to any neural network architecture, for example, including but not limited to, fully connected, partially connected, convolutional, recurrent, etc., and results in significant sparsity without adversely affecting the network accuracy.

All conventional neural networks today represent the weights connecting one layer to another as a dense matrix. For example, in order to store the weights connecting two layers of sizes 10 and 20 neurons, and assuming the network is fully connected, the network is represented by a 10×20 matrix containing floating point numbers. This representation is useful for forward and backward propagation of activations as well, e.g., given an input of 10 values in the above example, the output values of the 20 neurons in the subsequent layer could be calculated by multiplying the vector of values (size=10) by the matrix of weights (size=10×20), and obtaining the output vector (size=20). Another added benefit of matrix representation is that fast matrix multiplication methods could be used to speed up the operations (e.g., BLAS libraries, or dedicated GPU libraries such as CUBLAS or CUDNN). Matrix representation is used for other types of neural networks as well, e.g., convolutional, recurrent, etc.

While the matrix representation is very convenient and efficient to implement for dense neural networks (having many or a majority of active synapses), it is not an efficient representation for sparse neural networks (having few or a minority of connected synapses). The speed of neural network prediction is proportional to the number of weights in the neural network. Using the above example of the 10×20 matrix of weights, the matrix would represent a sparse neural network by setting the values of most of the weights to zero. However, zeroing matrix weights does not reduce the number of entries in the matrix and therefore does not reduce the number of computations performed over the neural network. Thus, the memory and computational requirements in the matrix representation are the same for a sparse neural network as for a dense neural network (the zero value is stored and multiplied just like a non-zero value in matrix multiplication). In other words, setting weights to zero in the matrix representation does not eliminate those weights from memory or reduce the number of associated computations. Accordingly, pruning weights in a matrix representation does not improve memory or performance of a neural network.

A new compact representation of neural networks is provided according to some embodiments of the invention that independently indexes each weight (independently defines which synapse the weight represents), which allows weights of pruned synapses to be skipped or discarded. In conventional matrix representation, each weight is indexed by its position in the matrix (e.g., a weight in row i column j represents the synapse connecting the ith neuron in a first layer to a jth neuron in a second layer). Additional matrices may be used to store weights for each pair of layers. Because indexing is based on matrix position, weights cannot be eliminated as they would shift the position of other weights in the matrix. This causes a sparse neural network to be represented by a sparse matrix of mostly zero entries, which is a waste of both memory for storing mostly zero weights and computations for multiplying the zero weights. By independently indexing each weight according to embodiments of the invention, the indices of weights do not depend on each other, and so each pruned weight may be discarded entirely without affecting the indexing of other weights. This independent indexing thereby eliminates the need to store entries for disconnected synapses (reducing memory consumption) and eliminates computations performed based on disconnected synapses (increasing processing speed). Because the speed of running a neural network is proportional to the number of weights therein, a sparse neural network according to embodiments of the invention with only a fraction of adjacent neurons connected by weights will run in a fraction of the time as does a fully connected neural network.

This compact representation further provides an efficient way to identify weights of "skip connections" (e.g., connections between non-adjacent or distant layer neurons). Generally, conventional neural networks only model weights of local connections between adjacent layers because the number of connections grows exponentially with the number of interrelated layers. This results in an exponential increase in the matrix size (adding weights that are mostly zero or approximately zero) and an exponential increase in the number of computations (adding results that are mostly zero), all with little effect on the neural network. Accordingly, conventional neural networks generally avoid skip or cross-layer connection and only model local connections. However, according to embodiments of the invention, because each weight is individually indexed, one or more non-zero weights may be individually added to the neural network that represent connections between any non-adjacent or distant layers, without adding the mostly zero weights that represent no cross-layer connection. Accordingly, embodiments of the invention improve the accuracy of the neural network by adding skip connection weights, without the typical detriment of a massive increase in storage.

Some embodiments may generate a sparse convolutional neural network (CNN). A CNN is represented by a plurality of filters that connect a channel of an input layer to a channel of a convolutional layer. The filter scans the input channel, operating on each progressive region of neurons (e.g., representing a N×N pixel image region), and maps the convolution or other transformation of each region to a single neuron in the convolution channel. By connecting entire regions of multiple neurons to each single convolution neuron, filters form synapses having a many-to-one neuron connection, which reduces the number of synapses in CNNs as compared to the one-to-one neuron connections in standard NNs. Some embodiments may generate a sparse CNN by pruning or zeroing entire filters that have all zero or near zero weights representing weak convolutional relationships between channels. An new CNN indexing is used that independently and uniquely identifies each filter in the CNN so that pruned filters are not stored, reducing convolution operations and memory usage.

Reference is made to FIG. 1, which schematically illustrates a dense neural network 100 in accordance with some embodiments of the invention.

A neural network 100 includes a plurality of artificial neurons 102. Artificial neurons 102 may be arranged in a hierarchy of multiple layers. Neural network 100 may include an input layer (neurons 1-4), one or more middle or hidden layer(s) (neurons 5-8), and an output layer (neurons 9-12). Each neuron 102 in each layer is connected by an artificial synapse connection 104 to some neurons (partially-connected) or all neurons (fully-connected) in an adjacent layer. Neurons (1-4) in the input layer are connected to neurons in the subsequent higher layer, neurons (5-8) in the middle layer are connected to neurons in both the previous and subsequent layer, and neurons (9-12) in the output layer are connected to neurons in the previous lower layer. Neural network 100 may be represented by a plurality of weights representing the strengths of the respective plurality of synapse connections 104.

Neural network 100 is a "dense" neural network, in which a majority or greater than or equal to a threshold percentage of neurons 102 in adjacent layers are connected (e.g., having non-zero connection weights). The threshold may be any percentage in a range of from greater than 50% (majority connected) to 100% ("fully-connected"), and is typically 90-99% connected. In the example shown in FIG. 1, all neurons 102 in adjacent layers are connected to each other, so neural network 100 is a fully-connected neural network. In this example, each pair of adjacent layers of four neurons has 16 possible connections, and with two pairs of adjacent layers, there are 32 neuron connections and associated weights.

Reference is made to FIG. 2, which schematically illustrates a sparse neural network 200 in accordance with some embodiments of the invention. As in FIG. 1, neural network 200 includes a plurality of artificial neurons 202 arranged in a hierarchy of multiple layers. However, neural network 200 is sparse. A "sparse" neural network may refer to a neural network, in which a minority or less than or equal to a threshold percentage of neurons in adjacent layers are connected by synapse connections 204 (or a majority or greater than a threshold percentage of neurons in adjacent layers are not connected). The threshold may be any percentage in a range of less than 50% (minority connected) and may be 1-10% connected. In the example shown in FIG. 2, neural network 200 has only 10 connections of the 32 possible neuron connections (e.g., 31.25%).

The dense neural network 100 of FIG. 1 may be transformed to generate the sparse neural network 200 of FIG. 2 by pruning a majority or an above threshold percentage of connections 104 or their associated weights of the dense neural network 100 of FIG. 1. Weights may be pruned by disconnecting previously connected neuron pairs. Additionally, sparse neural network 200 may be trained using methods such as genetic algorithms, genetic programming, reinforcement learning, etc., that evolve the neural network. Sparse neural network 200 may have a hybrid mixture of various types of connections, such as, e.g., locally connections, recurrent connections, skip connections, etc. with a sparse representation. Efficiently evolving a neural network with such a mixture of connection is only possible with the compact representation of embodiments of the invention.

Additionally or alternatively, sparse neural network 200 may be generated or received as a sparse network in the first place (without pruning).

Sparse neural network 200 may be represented by a plurality of weights of connections 204. In conventional matrices, pruned or omitted weights are set to zero, and treated the same as connected weights, which yields no significant storage or processing benefit to pruning. According to embodiments of the invention, a new data structure 206 is provided in which each of the plurality of weights (column 3 of data structure 206) is associated with a unique index (columns 1-2 of data structure 206). Because the weights are explicitly indexed in each data entry, the order of the data entries in representation 206 no longer serves as their implicit index, and the weight entries may be shuffled or reordered with no loss of information. In particular, there is no reason to store a weight of zero as a placeholder to maintain indexing as in matrix representations. Accordingly, when two neurons are disconnected (by pruning) or not connected in the first place, data structure 206 simply deletes or omits an entry for that connection entirely (e.g., no record of a weight or any information is stored for that connection).

By only storing non-zero weights that represent active connections 204 between pairs of neurons 102 (and not storing zero weights that represent disconnections, inactive connections, or no connections, between pairs of neurons), data structure 206 may reduce the memory for storing sparse neural network 200 by an amount directly proportional to the sparsity of the network. If X % of the synapses are removed or omitted leaving only 100–X % of the synapses, and the index uses the same number of bits as the weight, then the weight entries may occupy 2×(100–X)% of the storage than occupied by a fully connected neural network (e.g., a 99% sparsity results in a sparse representation that requires only 2% of the memory used for the dense representation, i.e., 50 times less memory usage).

The speed of running a neural network is proportional to the number of weights in the neural network. Pruning or omitting connections in sparse neural network 200 may result in a direct prediction speed-up in proportion to the amount of sparsity (e.g., if X % of the synapses are removed or omitted leaving only 100–X% of the synapses, then the resulting neural network will perform 100/(100–X) times faster than a fully connected neural network).

Figure 3:
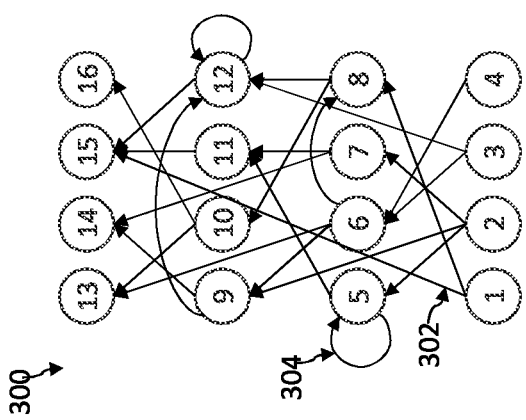
FIG. 3 is a schematic illustration of a sparse neural network with skip and recurrent connections, in accordance with some embodiments of the invention.

Reference is made to FIG. 3, which is a schematic illustration of a sparse neural network 300 with skip connections 302 and recurrent connections 304, in accordance with some embodiments of the invention.

Connections typically occur between neurons in adjacent layers (see e.g., FIGS. 1 and 2). Allowing connections between a layer and a non-adjacent layer (skip connections) or between a layer and itself (recurrent connections) would exponentially grow the number of combinations of neuron connections. Because matrix representations stores entries for all combinations of neurons, whether zero or non-zero, skip and recurrent connections would prohibitively grow memory usage and processing times. In the example of FIG. 3, adding skip and recurrent connections would grow a matrix representation from 48 to 128 independent weight entries (e.g., 16 weights for each six pairs of different layers and 16 weights of recurrent connections for the two hidden layers).

According to some embodiments of the invention, by independently indexing (or otherwise identifying) the neuron pair connected by each weight, zero weights may be deleted or omitted from data representation 306. Accordingly, only a subset of the possible connections that have non-zero weights are recorded (omitting the remaining subset of the possible connections that have zero weights). Adding skip connections 302 and recurrent connections 304 to neural network 300 thereby only adds entries to data representation 306 that are associated with non-zero weights (highlighted rows in 306). When those non-zero skip and recurrent connections are sparse (e.g., a minority of all possible skip and recurrent connections are made), the memory usage and computations are only slightly increased. In the example of FIG. 3, adding skip and recurrent connections 302 and 304 only adds nine entries to data representation 306 (significantly less than the 80 entries for all possible skips and recurrences that would be added in matrix representation). Accordingly, some embodiments of the invention provide a data representation 306 that is sufficiently compact to allow neural networks to include skip and/or recurrent connections 302 and 304, which may improve the accuracy of the neural network. Additionally, the larger the neural network, the larger the percentage of sparsity that could be achieved. This ranges from typically low 90% sparsity for neural networks containing hundreds of thousands of connections up to 99.9% sparsity for neural networks with billions of connections (i.e., the larger the neural network, the greater the benefit due to the sparse representation).

Figure 4:
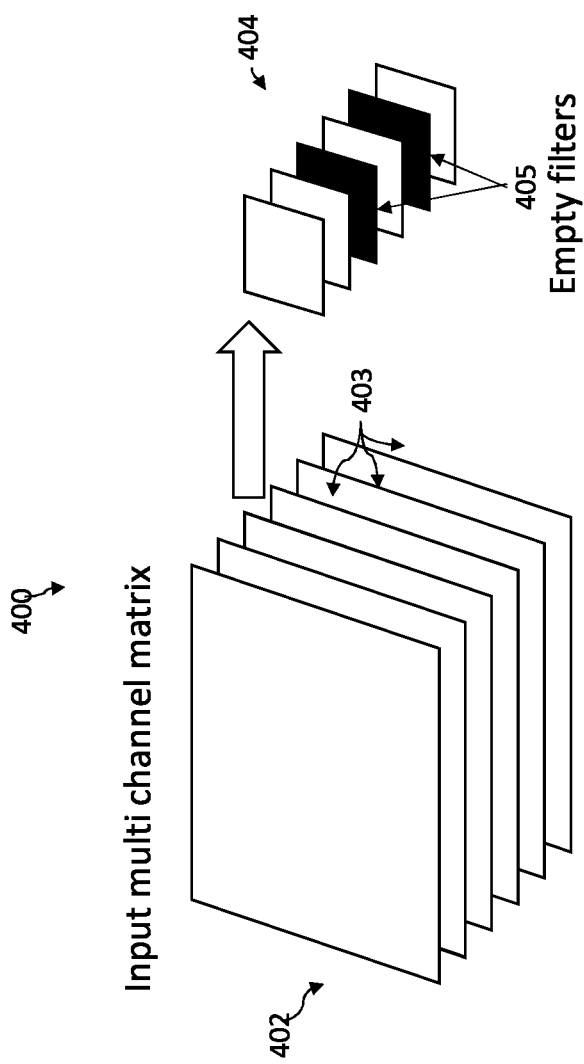
FIG. 4 is a schematic illustration of a system for generating a sparse convolutional neural network in accordance with some embodiments of the invention.

Reference is made to FIG. 4, which is a schematic illustration of a sparse convolutional neural network (CNN) 400, in accordance with some embodiments of the invention.

CNN 400 may include a plurality of layers 402, each layer 402 including one or more channels 403, each channel 403 including a plurality of artificial neurons. For example, CNN 400 may have an input layer that represents a color image and has three color-channels (e.g., red, green and blue channels). CNN 400 may be represented by a plurality of convolution filters 404. Each filter 404 represents a group of a plurality of weights that are the convolution or transformation of regions of neurons (e.g., representing an N×N pixel image region) of one channel to neurons in a channel of an (adjacent or non-adjacent) convolution layer. An example 2D convolution filter 404 includes a set of N×N weights (e.g., a, b, c, . . . ) such that it convolves each N×N group of neurons (e.g., 1, 2, 3, . . . NN) in an input channel (e.g., 1a+2b+3c+ . . . ) to equal a single connected convolution neuron in a convolution channel. The same single convolution filter 404 of N×N weights is used to convolve all N×N groups of neurons throughout the input channel. In general, convolution filter 404 may have various dimensions including one-dimensional (1D) (e.g., a 1×N row filter or N×1 column filter operating on a column or row of neurons), two-dimensional (2D) (e.g., a N×M filter operating on a 2D grid of neurons), three-dimensional (3D) (e.g., a N×M×P filter operating on a grid over multiple channels in a layer), . . . , or N-dimensional (ND) (e.g., operating on a grid over multiple channels and multiple layers). While only a few filters are shown for simplicity, often each layer 402 may be represented by hundreds or thousands of filters 404. Computing weights for hundreds or thousands of convolutions filters is a complex and time-consuming task.

According to embodiments of the invention, weak or near zero filters may be pruned and deleted to avoid their associated convolution operations and speed-up training and/or prediction of CNN 400. Whereas conventional CNNs store and operate on zero filters in the same way as non-zero filters, which yields no significant storage or processing benefit to pruning, according to embodiments of the invention, a new data structure 406 is provided which only stores non-zero filters 404. Conventional CNNs represent each layer by a 4-dimensional matrix (not including the batch of training samples), where each filter is represented by a 2D matrix (e.g., 3×3 or 5×5) and is positioned in the other two dimensions of the matrix to define the input/output channels to which the filter is applied. In contrast, the new data structure 406 uses a triplet representation with two channel indices (columns 1-2) that uniquely define the input/output channels to which the filter 404 applies and one filter representation (column 3) that defines the filter's weights. Because filters 404 are explicitly indexed in each data entry, the matrix position of the data entries no longer serves as their implicit index, and filters 404 entries may be shuffled, reordered or deleted with no loss of information. In particular, there is no reason to store a zero filter (a filter with all zero weights) as a placeholder to maintain indexing as in matrix representations. Accordingly, when channels of neurons are disconnected (by pruning) or not connected in the first place, data structure 406 simply deletes or omits an entry for the associated filter entirely (e.g., no record of any weight or any information is stored for that filter). In various embodiments, data structure 406 may omit 1D, 2D, 3D, or ND filters, e.g., as predefined or as the highest dimensionality that is fully zeroed.

By only storing non-zero filters that represent active convolutions between neurons (and not storing zero filters that represent no or negligible convolutions between neurons), data structure 406 may reduce the memory for storing sparse convolution neural network 400 by an amount proportional to the amount of filters deleted in the CNN.

The speed of running a convolutional neural network is proportional to the number of filters in the CNN. Pruning or omitting filters in sparse convolutional neural network 400 may result in a direct prediction speed-up in proportion to the number of filters omitted in the CNN.

It will be appreciated by persons of ordinary skill in the art that the arrangement of data structures in FIGS. 1-4 are examples only and other numbers, sizes, dimensions and configurations of neurons, connections, filters, channels, and layers may be used.

Triplet Representation Instead of Matrix Representation: In an embodiment of the invention, a conventional matrix representation of weights (Table 1) is replaced with a "triplet representation" of weights in a neural network (Table 2). The following example illustrates the differences between representing 12 weights in matrix representation as a matrix of size 4×3 and in triplet representation as 12 independent entries:

TABLE 1

| Dense Matrix Representation | | |
|---|---|---|
| 1.5 | −0.5 | −0.1 |
| 0.2 | 0.6 | −1.2 |
| 0.4 | −0.4 | 0.9 |
| −0.6 | 1.3 | 1.0 |

TABLE 2

| Dense Triplet Representation | | |
|---|---|---|
| Row | Column | Value |
| 0 | 0 | 1.5 |
| 0 | 1 | −0.5 |
| 0 | 2 | −0.1 |
| 1 | 0 | 0.2 |
| 1 | 1 | 0.6 |

TABLE 2-continued

| Dense Triplet Representation | | |
|---|---|---|
| Row | Column | Value |
| 1 | 2 | −1.2 |
| 2 | 0 | 0.4 |
| 2 | 1 | −0.4 |
| 2 | 2 | 0.9 |
| 3 | 0 | −0.6 |
| 3 | 1 | 1.3 |
| 3 | 2 | 1.0 |

The matrix representation (Table 1) includes a single value for each weight. The matrix representation identifies the pair of neurons connected by the weight based on the weight's position in the matrix. For example, the row index represents the neuron ID or index in a first layer and the column index represents the neuron ID or index in a second layer.

The triplet representation also lists the weight values (Table 2, column 3), and in addition independently indexes each weight with two values, e.g., "from" and "to" neuron IDs, identifying the pair of neurons connected by the weight (Table 2, columns 1 and 2). The triplet representation for standard NNs may be modified for convolutional NNs by replacing the neuron indices (columns 1 and 2) with channel indices, and replacing individual neuron weights (column 3) with the plurality of weights of filters.

The triplet representation is counterintuitive because, on its face, it appears inefficient and wasteful, requiring three times more memory (e.g., 36 entries) as compared to the matrix representation (e.g., 12 entries). And indeed, triplet representation does use more memory than matrix representation when the neural network is dense (speed remains the same or worse). However, despite the inefficiency in dense neural networks, the sparser the neural network is, the greater the advantage of triplet representation becomes. In one example, there is a tipping point of 50% sparsity, above which triplet representation is more compact and below which matrix representation is more compact (for processing speed, a sparser neural network using this representation will always be faster than a denser neural network, regardless of the level of sparsity). In one embodiment, both matrix and triplet representation may be used according to sparsity levels to use the representation that is most compact for that level. In other embodiments, triplet representation may be exclusively used to represent neural networks.

An example of the benefit of triplet representation over matrix representation for sparse neural networks is shown in Tables 3 and 4 below. Tables 3 and 4 below show a pruning of the weights in Tables 1 and 2, setting 18 of the 20 values thereof to zero. The matrix representation and triplet representation of the resulting sparse neural network is shown respectively as follows:

TABLE 4

| Sparse Triplet Representation | | |
|---|---|---|
| Row | Column | Value |
| 1 | 0 | 0.2 |
| 2 | 2 | 0.9 |

TABLE 3

Sparse Matrix Representation

| | | |
|---|---|---|
| 0 | 0 | 0 |
| 0.2 | 0 | 0 |
| 0 | 0 | 0.9 |
| 0 | 0 | 0 |

In the above case, the triplet representation requires half the memory of matrix representation (in practice, the triplet memory reduction is even greater, as discussed below). Further, the triplet representation of the neural network runs ten times computationally faster than the matrix representation because the triplet representation stores only two weights (resulting in two computations) whereas the matrix representation stores twenty weights (resulting in 20 computations).

For each individual weight, although the triplet has three times more values (index i, index j, value) than the corresponding single weight value in the matrix representation, in one example, each index values only requires half the information as the weight value, resulting in a total memory increase by only a factor of two. For example, the triplet may be represented by:

32 bit floating point for the weight value
16 bit integer for "from" neuron ID
16 bit integer for "to" neuron ID This triplet has a total of 64 bits per weight, which is twice the memory space as required in the matrix representation of 32 bits per weight. In general, in this example, a neural network with M times fewer weights may have a M times speed increase in computational speed, and a M/2 times reduction in memory usage using this example triplet representation as compared to using a matrix representation.

It may be appreciated that "triplet" representation is only an example of independently indexing weights and any other index or representation of the connected neurons may be used. In another example, a "doublet" representation may be used comprising a single weight value and a single index value, where all pairs of neurons (or filters in CNNs) have a single index value that is a unique identifier (e.g., 1-12 in FIGS. 1-2). In another example, a "quartet" or "quintet" representation may be used adding a value to index the "From" and/or "To" layer indices or channel indices (for CNNs).

A new storage system optimized for sparse data representations (e.g., 206, 306, 406) may provide a significant benefit in the training and prediction performance of neural networks. A conventional sparse matrix is stored in a main (e.g., long-term) memory with large gaps between non-zero values, causing memory recalls to jump to different points in the memory (e.g., from memory location 1 to 100 to 1,000,000). Memory access can often take more time than the NN computation themselves, so such large jumps in memory access are typically very slow. According to an embodiment of the invention, there is provided a new storage system that pre-fetches values from the main memory into a faster secondary (e.g., cache) memory according to a sparsity pattern of the NN. The sparsity pattern of the NN is the index pattern of only the subset of the NN's non-zero values. The sparsity pattern does not define the non-zero values themselves, but simply identifies the indices associated with non-zero values (omitting the indices associated with zero values) and thus, the memory locations that are accessed to operate the sparse NN. Pre-fetching non-zero values based on the NN's sparsity pattern, pre-identifies which indices need to be accessed and skips indices for zero valued weights or filters that do not need to be accesses. Since the sparsity pattern of non-zero weights changes during training, index reordering may be performed after each sparse pattern update, to maximize the number of shared indices by sequential rows in the matrix. This allows the caching of only non-zero values from the dense vector with which the matrix is multiplied (e.g., the input to the current layer, the output of the previous layer). Unlike dense matrix multiplications, most sparse matrix operators result in many memory address jumps, resulting in significant computational delays. To alleviate the inefficiency of memory jumping and caching unused (zero) values, which oftentimes is the bottleneck of NN operations, pre-caching data according to the sparsity pattern ensures that all cached data are the non-zero values operated on by a processor (e.g., no zero values are cached), thereby increasing storage efficiency and speeding up memory access.

Additional Sparse Data Representations: The following representations may replace the inefficient conventional sparse matrix representation, additionally or alternatively to the triplet representation.

A compressed sparse row (CSR) data representation may be used to reduce storage for a sparse matrix. A CSR may represent a matrix in row form using three (one-dimensional) arrays, the first array defining the non-zero values of the matrix and the remaining arrays representing the sparsity pattern of the matrix. For sparse convolutional neural networks, embodiments of the invention may use modified triplets to represent a 4-dimensional (or higher) matrix (e.g., as shown e.g., in FIG. 4) or a CSR-based indexing method, or a combination of the two e.g., for different dimensions of the matrix.

A map representation may replace the conventional matrix with a map where the "from" and the "to" neuron IDs (or filter IDs) are mapped to the weight w. This requires a similar amount of storage as the triplet representation, but allows faster access to individual weights (zero and non-zero alike), at the cost of slower addition of new non-zero weights.

A list representation may replace the conventional matrix with a list of pairs <"from", inner_list>, while the inner lists include pairs of the form <"to", w>, where "to", "from", and w are as above. A variant of the above is holding a list of sparse vectors, e.g., to represent the matrix as a list of the size of the number of rows, whose elements are lists of <j, w> pairs (possibly empty, if the neuron at this index has no connections). The list representation may be used with any sparse vector representation, e.g., as follows.

Sparse vector representations include, for example:

A list of <index, value> pairs, either ordered by indices, or unordered.

A dictionary, or a map where an index of a non-zero element is mapped to the element. Missing indices may be treated as zeros.

Two arrays, one data array holding all non-zero elements, and an index array, which holds the index of the matching data element in the original vector.

A sparse vector of sparse vectors may replace the conventional matrix with a sparse vector in one of the possible sparse vector representations, where each data element is another sparse vector. This may be particularly useful for matrices with multiple zero rows/columns.

A Compressed Sparse Row (a.k.a. Compressed Row Storage) representation may replace the conventional matrix with three arrays: (1) A first data array holding all non-zero weights (e.g., sorted in row-major order, i.e. left-to-right, then top-to-bottom). (2) A second data array represents an incrementing number of elements, by rows (so first element is always zero, the second is the number of non-zero elements in the first row, the third is the number of non-zero elements in the first two rows, and so on, until the last element, which is always the total number of non-zero elements in the entire matrix). (3) A third data array contains the column index j (i.e. the "to" identifier of a neuron) of each non-zero element, matching their order in the data array.

A Compressed Sparse Column (a.k.a. Compressed Column Storage, a.k.a. Harwell-Boeing Sparse Matrix) representation may replace the conventional matrix with three arrays: (1) A first data array of all non-zero weights (e.g., sorted in column-major order, i.e. top-to-bottom, then left-to-right) just like in Compressed Sparse Row. (2) A second data array represents the list of row indices corresponding to the values. (3) A third data array contains a list of indices of the data array, where each new column starts. For example, [1,2,4] means the first element in the data array belongs to the first column in the matrix, the second, and the third elements belong to the second column, and the fourth element begins the third column.

A Modified Compressed Sparse Row: Improves CSR representation may replace the conventional matrix with two arrays: (1) The first data array holds the diagonal values first (e.g., including zeros, if there are any on the diagonal), then the remaining non-zero elements in row-major order (same way as the regular CSR). (2) The second (index) data array is of the same length as the first one. The elements matching the diagonal elements in the first array point to the first element of that row in the data array (so the first element is always the size of the diagonal plus one), while the elements matching the rest of the data specify the column index of that data element in the matrix. For example, a 4x4 matrix with the following values: [[1,2,0,3], [0,4,5,0], [0,0,0,6], [0,0,0,7]], would become the first data array: [1,4,0,7,2,3,5,6] and the second index array: [4,6,7,7,1,3,2,3].

A Modified Compressed Sparse Column representation may replace the conventional matrix with two arrays: (1) The first data array holds the diagonal values first (including zeros, if there are any on the diagonal), then the remaining non-zero elements in column-major order (same way as the regular CSC). (2) The second (index) array is of the same length as the first one. The elements matching the diagonal elements in the first array point to the first element of that column in the data array (so the first element is always the size of the diagonal plus one), while the elements matching the rest of the data specify the row index of that data element in the matrix. For example, a 4×4 matrix with the following values (same values as above): [[1,2,0,3], [0,4,5,0], [0,0,0,6], [0,0,0,7]], would become the first data array: [1,4,0,7,2,5,3,6] and the second index array: [4,4,5,6,1,2,3,3].

A Sparse Tensor representation: Tensors are a generalization of vectors and matrices to higher dimensionality. For example, a 3-dimensional tensor has three indices (rather than two for matrices, and one index for vectors), and may be considered as a vector, whose elements are matrices. Sparse tensor representations can be divided into two categories: (1) A combination of lower dimensional tensors, or a generalization of one of the methods specified. For example, a 3D tensor, may be represented as a vector of matrices, where each matrix is a sparse one, using any of the formats above. (2) Alternatively or additionally, a 3D tensor may be represented by a generalization of Compressed Sparse Row, where the data, the index, and the column arrays are as before, but the index array, maintains pairs of indices, rather than just the row indices.

Any combination of these or other data representations may be used.

Inducing Sparsity During Training: Several embodiments are provided for inducing sparsity during training including any combination of one or more of: $L_1$ regularization, $L_p$ regularization, thresholding, random zero-ing, new weight generation, evolving weights using genetic algorithms, and bias based pruning.

$L_1$ Regularization: Some embodiments of the invention may prune neuron connections using $L_1$ regularization during neural network training in each of one or more iterations (e.g., in addition to weight correcting updates such as backpropagation). The weights $w_{ij}$ of the neural network may be updated to weights $w_{ij}'$ in each training iteration, for example, as follows:

$$w'_{ij}=w_{ij}-\text{sgn}(w_{ij})*d$$

where d is a "weight decay" parameter (typically a very small number) and sgn is the sign function. In other words, at each weight update, the value of the weight is gradually decayed or driven towards zero. The larger the decay parameter (d) in the above equation, the faster the weights will approach zero, and the larger the portion of the weights that will become absolute zero, representing a disconnection (pruning of the connection) between neurons.

In one embodiment, pruning may be performed using $L_1$ regularization with a modification: The moment a weight becomes zero (or changes sign), the weight's memory entry is physically removed or deleted from storage (from the triplet representation table), and cannot grow back or regenerate to a non-zero value in the future (e.g., at any future time or for a set lock-out period of time or number of iterations).

$L_p$ regularization: $L_p$ regularization is an extension of $L_1$ regularization that can improve the desired behavior of "pushing" the weights in the network to zero, e.g., as follows:

$$w'_{ij}=w_{ij}-p*w_{ij}^{p-1}*d$$

where d represents a speed of the drive or push to zero, and p represents the power of the normalization factor in an $L_p$ normalization, which effectively represents the distribution of the values to which that drive is applied (e.g., p is a positive value). In this example, a higher p shifts the drive to zero more towards higher weights, putting less pressure on lower weights. When regularizing convolutional layers, a whole filter may be regularized together as a unit, in which case, the above $L_p$ regularization may be modified, e.g., as follows:

$$w'_{ij} = w_{ij} - \frac{1}{\sum_{k=-r}^{r} w_{i+k,j+k}^{p}} *d$$

where p is between 0 and 1, and where r is the radius of the kernel (a filter in a convolutional layer), e.g., the kernel is a matrix of size 2*r+1. In this modified $L_p$ regularization, the more neighboring filters have zero values, the greater the pressure on the filter to zero. $L_p$ regularization allows a flexible dynamic pressure, where p may be dynamically modified e.g., based on the percentage of sparsity, to push the derivative/norm of weights to zero. The above equations encourage weights to zero based on the values of the weights themselves and, for convolutional filters, based on the weights of neighboring weights in the same filter as well.

Thresholding: Weights and their entries may be physically deleted when the weight, though not zero, is below a near zero threshold:

if $(w_{ij} < \text{threshold}) \rightarrow w_{ij} = 0$

The threshold may be balanced to be sufficiently low to not undo error correction (e.g., backpropagation) during training, while being sufficiently high to prune at a reasonably fast rate and prevent that error correction from pulling values away from zero. Example thresholds include, but are not limited to, 0.1, 0.001, 0.0001, 0.00001, etc.

Rounding: Removes values after a pre-specified number of digits after the floating point. For example, given rounding at 5 digits, the value 0.12345678 is set to 0.12345. Rounding will zero a weight when the weight value is less than the minimum allowed by rounding. Otherwise, when rounding does not directly zero a weight, it may result in additional overall sparsity by disrupting some of the weight updates due to backpropagation. The pre-specified number of digits for rounding to may likewise be balanced to be sufficiently few to not undo error correction, while being sufficiently many to prevent that error correction from pulling values away from zero. Any integer number of digits after the floating point to which a weight is rounded may be used.

Random zeroing: Weights may be set to zero with either a fixed small probability (fully-random zeroing), or with a probability proportional to their current value (partially-random zeroing). In the latter case of partially-random zeroing the smaller the weight, the larger the probability of it becoming zero.

In general, any additional or alternative method of pruning that sets weights to zero or that decays weights to approach zero can be used here, including pruning randomly, probabilistically (e.g., with a probability proportional to their current value) and/or using mathematical or statistical heuristics.

New Weight Generation: Additionally or alternatively to setting weights to zero and deleting them from memory (pruning), some embodiments of the invention may randomly generate (create) new weights or connections that were not previously present. New weights may be generated randomly, probabilistically (e.g., the more the two neurons "fire together," the higher the probability that they would be connected and/or the higher the weight of that connection), and/or using mathematical or statistical heuristics.

Evolving sparse neural networks: Genetic algorithms (GA) may be used to train neural networks. GAs represent the set of weights of a neural network as an artificial "chromosome," e.g., where each chromosome represents one neural network. Genetic algorithms may evolve a population of such chromosomes by performing the steps of (a) measuring the fitness or accuracy of each chromosome (e.g., the lower the average loss over the training set, the better the fitness), (b) selecting the fitter chromosomes for breeding, (c) performing recombination or crossover between pairs of parent chromosomes (e.g., randomly choose weights from the parents to create the offspring), and (d) mutating the offspring. While GAs generally suffer from too much variability and volatility during training, the compact and fast representation of sparse neural networks disclosed herein may provide a balance to evolve neural networks efficiently. Alternatively or additionally, genetic programming (GP) could be used as well. GP works in a similar way to GA, with the difference that instead of representing the neural network as a chromosome, it is represented as a "tree". Thus, the neural network architecture (the layers and their connections) could be represented and evolved as a GP tree. While GA typically assumes fixed number of layers and neurons (and evolves only the connections), GP may evolve the number of layers, number of neurons, and/or their connections. As a further additional or alternative method for evolving the neural network architecture, reinforcement learning may also be applied, where a single instance of the neural network architecture is stochastically modified in order to maximize the overall accuracy.

Bias based neuron pruning: A bias unit may "bias" the weights of a neuron during training by adding a constant value to all of the neuron's weights. If a bias value is low enough (e.g., a large magnitude negative value), the bias unit may shift all the neuron's weights to a negative value. The bias unit may eliminate any output from neuron, e.g., with an activation function such as rectified linear unit (RELU), in which all negative or below threshold values are zeroed out. In effect, this turnss the whole neuron off, pruning such a neuron in its entirety from the network, including all of its incoming and outgoing weights. This can be achieved by regularization methods e.g. disclosed herein, but in this case pushing the value to a negative or below threshold target instead of zero.

Figure 5:
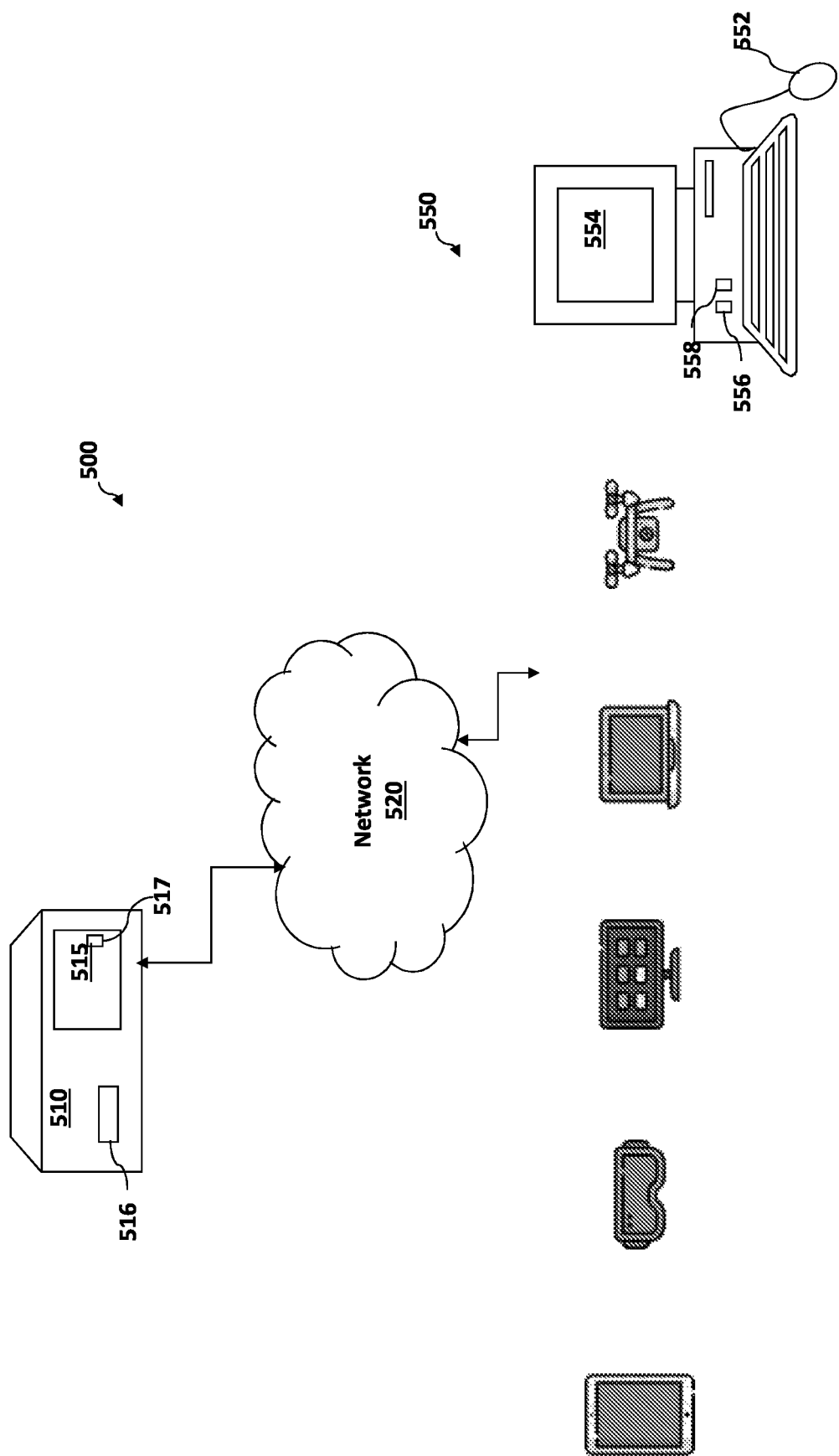
FIG. 5 is a schematic illustration of a system for generating a sparse neural network in accordance with some embodiments of the invention.

Reference is made to FIG. 5, which schematically illustrates a system 500 for generating and/or storing a sparse neural network according to an embodiment of the invention. System 500 may store and/or generate the data structures and implement the training and prediction of neural networks described in reference to FIGS. 1-4.

System 500 may include one or more local endpoint device(s) 550 and one or more remote server(s) 510 accessible to the local device via a network 520 or computing cloud. Typically, the neural network is trained by remote server 510 and run for prediction at one or more local endpoint devices 550, although either remote server 510 and/or local endpoint devices 550 may train and/or predict using a sparse neural network according to embodiments of the invention. In particular, a data representation (e.g., 206 of FIG. 2) is provided for sparse neural networks that is sufficiently compact to allow local endpoint devices 550, which typically have very limited memory and processing capabilities, to train and/or predict based on the sparse neural network. When local endpoint devices 550 perform training and runtime prediction, remote server 510 may be removed.

Remote server 510 may have a memory 515 for storing a neural network and a processor 516 for training and/or predicting based on the neural network. Remote server 510 may prune a dense neural network (e.g., 100 of FIG. 1) to generate a sparse neural network (e.g., 200 of FIG. 1), or may initially generate or receive a sparse neural network. In some embodiments, remote server 510 may have specialized hardware including a large memory 515 for storing a neural network and a specialized processor 516 (e.g., a GPU), for example, when a dense neural network is used. Memory 515 may store data 517 including a training dataset and data representing a plurality of weights of the neural network. Data 517 may also include code (e.g., software code) or logic, e.g., to enable storage and retrieval of data 517 according to embodiments of the invention.

Local endpoint device(s) 550 may each include one or more memories 558 for storing a sparse neural network according to a data representation (e.g., 206 of FIG. 2, 306 of FIG. 3, or 406 of FIG. 4) provided in some embodiments of the invention. The memory 558 may store each of a plurality of weights of the sparse neural network (e.g., column 3 of data representations 206, 306, and 406) with (or associated with) a unique index (e.g., columns 1 and 2 of data representations 206, 306, and 406). The unique index may uniquely identify a pair of artificial neurons that have a connection represented by that weight. In one embodiment, each weight may be represented by a triplet defining: (1) a first index value identifying a neuron in a first or "from" layer connected by the weight, (2) a second index value identifying a neuron in a second or "to" layer connected by the weight, and (3) the value of the weight. By independently indexing the weights, memory 558 may only store entries for connections with non-zero weights (e.g., deleting or omitting entries for disconnections or no connections associated with zero weights). Memory 558 usage for storing the sparse neural network may be reduced to 2×(100−X)% of the memory used for a dense neural network, for X % sparsity and two times the size of each weight entry, as compared to a fully connected neural network (e.g., a 99% sparse neural network uses only 2% of the amount of memory used for the dense representation, i.e., 50 times less memory usage). Local endpoint device(s) 550 may each include one or more processor(s) 556 for training, and/or executing prediction based on, the weights of the sparse neural network stored in memory 558. During prediction, the neural network is run forward once. During training, a neural network is run twice, once forward to generate an output and once backwards for error correction (e.g., backpropagation). Each time the neural network is run, the number of computations is reduced and the speed is increased proportionally to the reduction in the number of weights in the neural network. For a sparse neural network with X % sparsity, processor(s) 556 may run neural network (100/(100−X) times faster (with X % fewer computations).

Local endpoint device(s) 550 may include smart devices, personal computer, desktop computer, mobile computer, laptop computer, and notebook computer or any other suitable device such as a cellular telephone, personal digital assistant (PDA), video game console, etc., and may include wired or wireless connections or modems. Local endpoint device(s) 550 may include one or more input device(s) 552 for receiving input from a user (e.g., neural network parameters, such as, numbers, sizes, dimensions and configurations of neurons, synapses, and layers, accuracy or training thresholds, etc.). Local endpoint device(s) 550 may include one or more output device(s) 554 (e.g., a monitor or screen) for displaying data to a user generated by computer 550 or database 510. In various applications, local endpoint device(s) 550 is part of a system for image recognition, computer vision, virtual or augmented reality, speech recognition, text understanding, or other applications of deep learning. In the application of facial recognition, a device may use the sparse neural network to efficiently perform facial recognition to trigger the device to unlock itself or a physical door when a match is detected. In the application of security, a security camera system may use the sparse neural network to efficiently detect a security breach and sound an alarm or other security measure. In the application of autonomous driving, a vehicle computer may use the sparse neural network to control driving operations, e.g., to steer away to avoid a detected object.

Network 520, which connects local endpoint device(s) 550 and remote server 510, may be any public or private network such as the Internet. Access to network 520 may be through wire line, terrestrial wireless, satellite or other systems well known in the art.

Local endpoint device(s) 550 and remote server 510 may include one or more controller(s) or processor(s) 556 and 516, respectively, for executing operations according to embodiments of the invention and one or more memory unit(s) 558 and 515, respectively, for storing data 517 and/or instructions (e.g., software for applying methods according to embodiments of the invention) executable by the processor(s). Processor(s) 556 and 516 may include, for example, a central processing unit (CPU), a graphical processing unit (GPU, a field-programmable gate array (FPGA), an application-specific integrated circuit (ASIC), a digital signal processor (DSP), a microprocessor, a controller, a chip, a microchip, an integrated circuit (IC), or any other suitable multi-purpose or specific processor or controller. Memory unit(s) 558 and 515 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Other devices and configurations may be used, for example, data 517 may be stored in memory 558 and no separate server 510 may be used.

Figure 6:
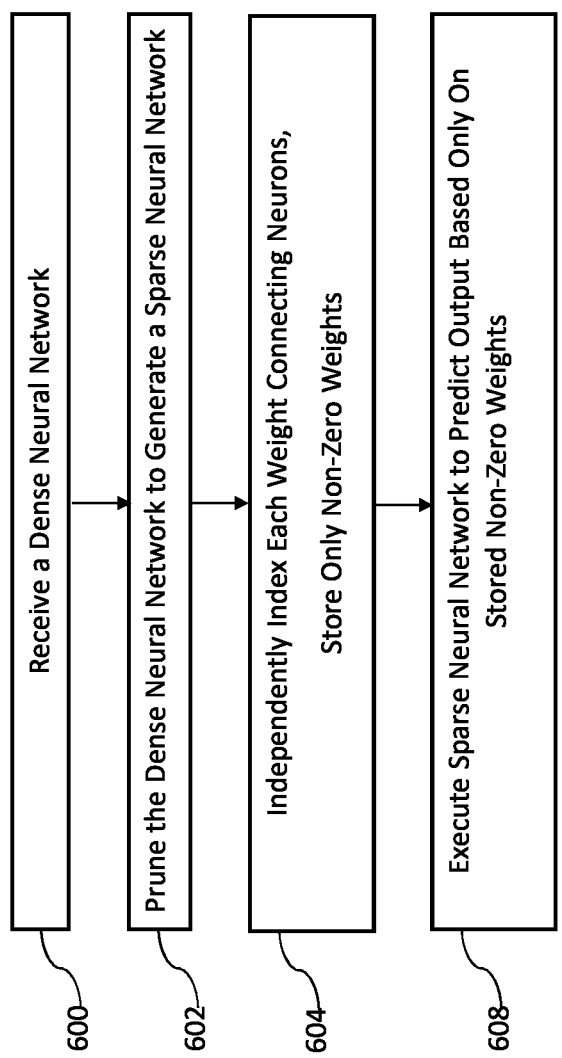
FIG. 6 is a flowchart of a method for generating a sparse neural network in accordance with some embodiments of the invention.

Reference is made to FIG. 6, which is a flowchart of a method for generating a sparse neural network in accordance with some embodiments of the invention. The operations of FIG. 6 may be executed by a processor (e.g., one or more processor(s) 556 of FIG. 5) using data stored in a memory (e.g., one or more memory unit(s) 558 of FIG. 5).

In operation 600, a processor may generate or receive and store a dense neural network in a memory. The dense neural network may have a majority or above threshold percentage of neurons in adjacent layers connected to each other. An example of a dense neural network is described in reference to FIG. 1.

In operation 602, a processor may generate, train, or receive a sparse neural network. In one embodiment, the processor may generate the sparse neural network by pruning the weights of the dense neural network of operation 600, or may generate the sparse neural network de novo. The processor may prune the neural network during and/or after a training phase of the neural network. The processor may prune weights using L1 regularization, thresholding, rounding, and/or random zeroing. The processor may prune weights randomly, probabilistically, and/or heuristically. The processor may generate one or more new weights in the sparse neural network by connection creation. New weights may be generated randomly, probabilistically, and/or heuristically. In some embodiments, the sparse neural network may be evolved using evolutionary computation (genetic algorithms or genetic programming) or using reinforcement learning.

The sparse neural network in operation 602 may be represented by a plurality of weights. Each weight may represent a unique connection between a pair of a plurality of artificial neurons in different layers of a plurality of neuron layers. Connections may be made between neurons in adjacent layers (local connections), in non-adjacent layers (skip connections), and/or within the same single layer (recurrent connections). The sparse neural network may have a minority or below threshold percentage of pairs of neurons in adjacent neuron layers are connected. Examples of sparse neural networks are described in reference to FIGS. 2-4.

In operation 604, a processor may store each of the plurality of weights of the sparse neural network with an association to a unique index. The unique index may uniquely identify a pair of artificial neurons that have a connection represented by the weight. The processor may only store non-zero weights in memory that represent connections between pairs of neurons and may not store zero weights that represent no connections between pairs of neurons. In one embodiment, each non-zero weight may be represented by a triplet of values (e.g., triplet rows of 206 in FIG. 2, 306 in FIG. 3, or 406 in FIG. 4) including (1) a first value of the index identifying a first neuron of the pair in a first one of the different layers (column 1), (2) a second value of the index identifying a second neuron of the pair in a second one of the different layers (column 2), and (3) the value of the weight (column 3).

In operation 608, a processor, e.g., in prediction mode, may retrieve from memory and run the sparse neural network of operation 604 to compute an output based only on the non-zero weights (and not based on the zero weights) of the sparse neural network. To predict, the processor may input source data into an input layer of the sparse neural network, propagate the data through the plurality of neuron layers of the sparse neural network by iteratively operating on the data in each layer by only the non-zero weights connecting neurons of that layer to subsequent layers, and output a result of the final layer of the sparse neural network. The processor, e.g., in training mode, may compare the result output by the final layer of the sparse neural network with a result of a training dataset and modify the one or more of the weights based on the comparison.

Other operations or orders of operations may be used. For example, instead of starting with a dense neural network in operation 600 and pruning the dense neural network to generate a sparse neural network, some embodiments may skip operation 600 and start a process at operation 602 by generating or obtaining a sparse neural network anew.

Results: Applying embodiments of the invention to several deep learning benchmarks resulted in a reduction of between 90-99.9% of the number of weights in a neural network, without any (or substantially any) reduction in accuracy. This corresponds to between 10 to 1000 times speed-up in computing speed for the neural network (during prediction mode, but also during training mode as the network becomes sparser in each iteration of training), and a 5 to 500 times reduction in memory usage.

Thus, deep learning networks can be run efficiently on devices with minimal amount of CPU capability and memory availability (e.g., local endpoint device(s) 550 of FIG. 5), not just specially hardware in cloud or network-side servers (e.g., remote server 510 of FIG. 5), something that was not possible until now. Additionally, the compact (e.g., triplet) representation of weights may be easily parallelized on any hardware (CPU, GPU, etc.) to further increase processing speed.

The disclosed compact (e.g., triplet) representation further allows for the easy addition of "skip connections" (e.g., 302 of FIG. 3) and "recurrent connections" (e.g., 304 of FIG. 3). In neural networks typically neurons from layer N are only connected to neurons in the adjacent layer N+1. However, several methods (such as "ResNet") show that there may be significant improvement in prediction by adding skip connections (from layer N to layer N+X, where X>1). However, skip connections are difficult to implement using matrix representation (e.g., requiring dense connections from layer N to layer N+X, which would explode the number of weights in the model). Using the compact (e.g., triplet) representation according to some embodiments of the invention, skip connections may be easily added (e.g., represented by a triplet=FromNeuronID, ToNeuronID, Weight, where "FromNeuron" and "TwoNeuron" may be in non-adjacent or distant layers), without any performance penalty.

Using the compact (e.g., triplet) representation, embodiments of the invention may start with a sparse neural network. That is, instead of starting with a dense neural network and then pruning, such embodiments may already start with a sparse neural network. These promising sparse networks are not actively researched today due to implementation difficulties using matrix representation. According to embodiments of the invention, there is now provided a compact and fast mechanism for storing and running sparse neural networks.

Further, these compact representations for sparse neural networks may provide sufficient efficiency to evolve the sparse neural networks.

To speed-up training and prediction of a convolutional NN, the convolution operation (e.g., which is typically relatively slow and complex) may be equivalently performed by a matrix multiplication operation executed on rearranged and duplicated terms (e.g., typically relatively faster and less complex than the convolution operations). This transformation is referred to as an "img2col" function. Some embodiments provide a new and more compact img2col function adapted for a sparse CNN. In a regular img2col function, two custom matrices are constructed to represent every convolutional operation performed by a layer, such that each row and column multiplication represents a convolutional operation. Embodiments of the invention may provide a modified img2col function, in which some of the kernels are zeroed out, and the associated matrices can be modified to omit or delete these rows and columns. This results in more compact matrices associated with fewer multiplication operations to achieve the same convolutional results, compared to standard img2col operations.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory (e.g., memory units 515 or 558 of FIG. 5), a disk drive, or a USB flash memory, encoding, including or storing instructions, e.g., computer-executable instructions, which, when executed by a processor or controller (e.g., processor 556 of FIG. 5), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method for efficiently storing a neural network, the method comprising:
receiving a dense neural network comprising a plurality of weights, each weight representing a unique connection between a pair of a plurality of artificial neurons in different layers of a plurality of neuron layers, wherein the dense neural network comprises at least one hidden layer, wherein a majority of pairs of neurons in different neuron layers are connected by weights in the dense neural network;
transforming the dense neural network into the sparse neural network during a training phase so that a minority of pairs of neurons in different neuron layers are connected by weights in the sparse neural network;
storing only non-zero weights of the sparse neural network that represent unique connections between the pairs of artificial neurons and not storing zero weights of the sparse neural network that represent no connections between the pairs of artificial neurons.

2. The method of claim 1 comprising storing a triplet of values identifying each non-zero weight of the sparse neural network comprising:
a first value of an index identifying a first neuron of the pair in a first one of the different layers,
a second value of the index identifying a second neuron of the pair in a second one of the different layers, and
the value of the weight.

3. The method of claim 1 comprising transforming the dense neural network into the sparse neural network using one or more techniques selected from the group consisting of: L1 regularization, Lp regularization, thresholding, random zero-ing, new weight generation, evolving weights using genetic algorithms, and bias based pruning.

4. The method of claim 1 comprising:
fetching weights from a main memory that are stored in non-sequential locations in the main memory according to a non-sequential pattern of indices associated with non-zero weights in the sparse neural network; and
storing the weights fetched from non-sequential locations in the main memory to sequential locations in a cache memory.

5. The method of claim 1 comprising storing values of the weights of the sparse neural network using one or more data representations selected from the group consisting of: compressed sparse row (CSR) representation, compressed sparse column (CSC) representation, sparse tensor representation, map representation, list representation and sparse vector representation.

6. The method of claim 1, wherein one or more of the plurality of weights is pruned randomly, probabilistically, or heuristically.

7. The method of claim 1 comprising caching only the non-zero weights identified by the associated unique indices so that weights with non-consecutive indices are consecutively stored, skipping indices associated with the zero weights.

8. The method of claim 1 comprising generating one or more new weights in the sparse neural network.

9. The method of claim 1, wherein one or more of the plurality of the weights represent skip connections between pairs of artificial neurons in non-adjacent layers.

10. The method of claim 1, wherein the neural network is a recurrent neural network and one or more of the plurality of the weights represent recurrent connections between pairs of artificial neurons within the same layer.

11. A method for efficiently storing a convolutional neural network, the method comprising:
receiving a dense convolutional neural network comprising a plurality of neuron channels in one or more neuron layers, each neuron channel comprising a plurality of artificial neurons, the dense convolutional neural network represented by a plurality of convolutional filters, each convolutional filter comprising a plurality of weights representing a unique connection between the neurons of an input channel of an input layer and the neurons of a convolutional channel of a hidden convolutional layer, wherein a majority of pairs of channels in different neuron layers are connected by convolutional filters in the dense neural network;

transforming the dense convolutional neural network into the sparse convolutional neural network during a training phase so that a minority of pairs of channels in different neuron layers are connected by convolutional filters in the sparse neural network; and storing only convolutional filters with non-zero weights of the sparse neural network that represent unique connections between the channels of the sparse convolutional neural network and not storing convolutional filters with all zero weights that represent no connections between the channels of the sparse convolutional neural network.

12. The method of claim 11 comprising storing a triplet of information identifying each convolutional filter with non-zero weights of the sparse convolutional neural network comprising:
a first value of an index identifying the input channel of the pair of channels,
a second value of the index identifying the output channel of the pair of channels, and
the weights of the convolutional filter.

13. The method of claim 11 comprising:
fetching convolutional filters from a main memory that are stored in non-sequential locations in the main memory according to a non-sequential pattern of indices associated with non-zero convolutional filters in the sparse convolutional neural network; and
storing the filters fetched from non-sequential locations in the main memory to sequential locations in a cache memory.

14. The method of claim 11 comprising, instead of performing convolution operations associated with the convolution filters, performing matrix multiplication on a transformed set of the filters with weights that are rearranged and duplicated to yield a result equivalent to said convolution operations.

15. The method of claim 14 comprising multiplying dense matrices omitting rows and columns associated with all zero values.

16. A system for efficiently storing a neural network, the system comprising:
one or more processors configured to:
receive a dense neural network comprising a plurality of weights, each weight representing a unique connection between a pair of a plurality of artificial neurons in different layers of a plurality of neuron layers, wherein the dense neural network comprises at least one hidden layer, wherein a majority of pairs of neurons in different neuron layers are connected by weights in the dense neural network, and
transform the dense neural network into the sparse neural network during a training phase so that a minority of pairs of neurons in different neuron layers are connected by weights in the sparse neural network; and
one or more memories configured to store only non-zero weights of the sparse neural network that represent unique connections between the pairs of artificial neurons and not storing zero weights of the sparse neural network that represent no connections between the pairs of artificial neurons.

17. The system of claim 16, wherein the one or more memories are configured to store a triplet of values identifying each non-zero weight of the sparse neural network comprising:
a first value of an index identifying a first neuron of the pair in a first one of the different layers,
a second value of the index identifying a second neuron of the pair in a second one of the different layers, and
the value of the weight.

18. The system of claim 16, wherein the one or more processors are configured to transform the dense neural network into the sparse neural network using one or more techniques selected from the group consisting of: L1 regularization, Lp regularization, thresholding, random zero-ing, new weight generation, evolving weights using genetic algorithms, and bias based pruning.

19. The system of claim 16 wherein the one or more memories comprise:
a main memory; and
a cache memory,
wherein the one or more processors are configured to fetch weights from the main memory that are stored in non-sequential locations in the main memory according to a non-sequential pattern of indices associated with non-zero weights in the sparse neural network, and store the weights fetched from non-sequential locations in the main memory to sequential locations in a cache memory.

20. A system for efficiently storing a convolutional neural network, the system comprising:
one or more processors configured to:
receive a dense convolutional neural network comprising a plurality of neuron channels in one or more neuron layers, each neuron channel comprising a plurality of artificial neurons, the dense convolutional neural network represented by a plurality of convolutional filters, each convolutional filter comprising a plurality of weights representing a unique connection between the neurons of an input channel of an input layer and the neurons of a convolutional channel of a hidden convolutional layer, wherein a majority of pairs of channels in different neuron layers are connected by convolutional filters in the dense neural network, and
transform the dense convolutional neural network into the sparse convolutional neural network during a training phase so that a minority of pairs of channels in different neuron layers are connected by convolutional filters in the sparse neural network; and
one or more memories configured to store only convolutional filters with non-zero weights of the sparse neural network that represent unique connections between the channels of the sparse convolutional neural network and to not store convolutional filters with all zero weights that represent no connections between the channels of the sparse convolutional neural network.

21. The system of claim 20, wherein the one or more memories are configured to store a triplet of information identifying each convolutional filter with non-zero weights of the sparse convolutional neural network comprising:
a first value of an index identifying the input channel of the pair of channels,
a second value of the index identifying the output channel of the pair of channels, and
the weights of the convolutional filter.

22. The system of claim 20 wherein the one or more memories comprise:
a main memory; and
a cache memory,
wherein the one or more processors are configured to fetch convolutional filters from a main memory that are stored in non-sequential locations in the main memory according to a non-sequential pattern of indices associated with non-zero convolutional filters in the sparse convolutional neural network, and store the filters fetched from non-sequential locations in the main memory to sequential locations in a cache memory.

23. The system of claim 20 comprising, instead of performing convolution operations associated with the convolution filters, the one or more processors are configured to perform matrix multiplication on a transformed set of the filters with weights that are rearranged and duplicated to yield a result equivalent to said convolution operations.

24. The system of claim 23, wherein the one or more processors are configured to multiply dense matrices omitting rows and columns associated with all zero values.

* * * * *